Sept. 11, 1934. E. M. HARVEY ET AL 1,973,434

REFRACTORY BRICK AND PROCESS OF MAKING SAME

Filed Sept. 5, 1933

Inventor:
Erie Mason Harvey
and John A. Boren.
by Lester L. Sargent
Atty.

Patented Sept. 11, 1934

1,973,434

UNITED STATES PATENT OFFICE 1,973,434

REFRACTORY BRICK AND PROCESS OF MAKING SAME

Erie Mason Harvey, Greensboro, and John A. Boren, Pomona, N. C.

Application September 5, 1933, Serial No. 688,252

4 Claims. (Cl. 25—156)

The object of our invention is to provide a novel refractory brick; to provide a novel process of making same; and especially to utilize a novel element, namely, pyrophyllite for the manufacture of refractory bricks. We attain these and other objects of our invention by the process hereinafter described.

Figure 1:
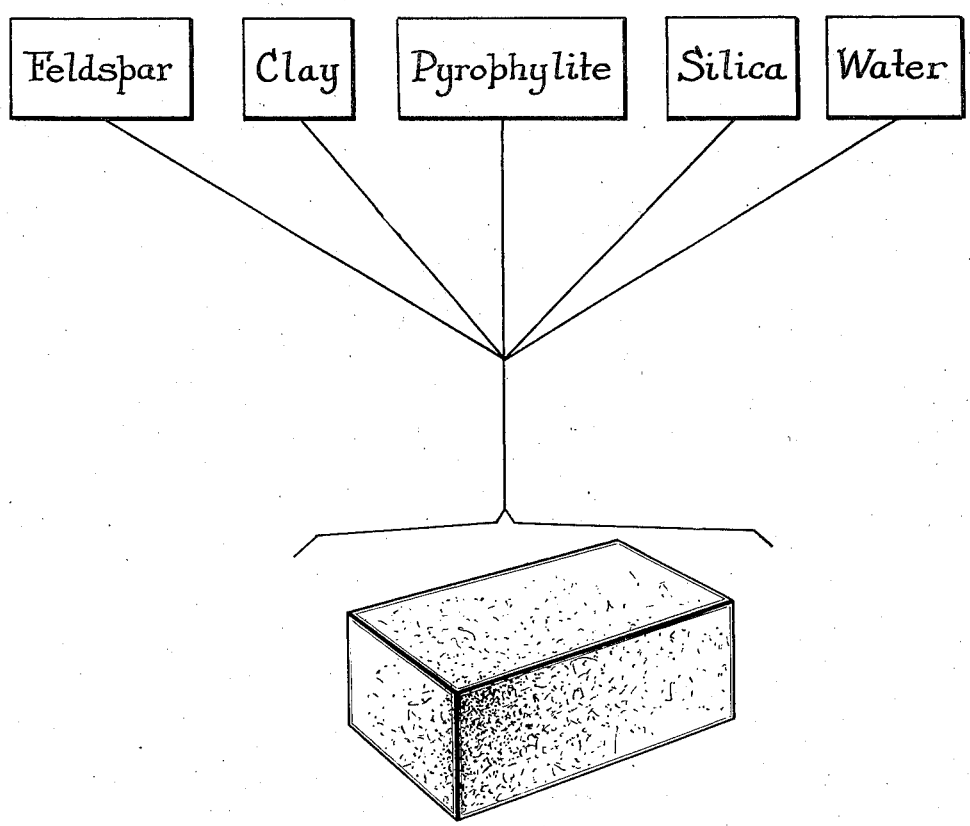
Figure 2:

Figure 1 of the drawing is a schematic diagram of the ingredients used in manufacturing our refractory brick; and Fig. 2 is a perspective view of the pyrophyllite which is the novel basic element used.

We employ a novel basic element in the process of manufacturing our refractory brick. This basic element is pyrophyllite which is found in quantities sufficient for commercial purposes only in North Carolina, in Moore county and adjoining counties. By combining this pyrophyllite with other elements contained in our formula, a brick may be produced that will withstand sustained high temperature for an indefinite period. This brick when produced will be of untold commercial value for use in relining stoves, furnaces, boilers and for other refractory uses.

The process used in the manufacture of this brick is as follows: First the pyrophyllite must be mined, then pulverized, then mixed with other ingredients contained in the formula in proportions ranging from 5% pyrophyllite to 95% pyrophyllite.

The other ingredients are silica, clay (comprising aluminum, iron, titania, lime, magnesia, and alkalies—$K_2O$ or $Na_2O$) and feldspar—either limespar, lime-soda spar, potash spar, soda spar, soda-lime spar.

When the ingredients have been mixed together sufficient water is added to make a plastic compound. This compound is then run through a die or wood mold in the desired shape of the brick. The wet brick are then placed in a tunnel dryer or in a building with a temperature of 110 degrees Fahrenheit where it remains from 48 to 60 hours. The brick is then taken out and placed in kiln and burned 5 to 6 days at a sustained temperature of 2300 degrees Fahrenheit. The brick is then allowed to cool under natural temperatures, which requires approximately 4 or 5 days for the cooling. When this process is completed the brick is ready for commercial use.

Chemically, the formula is as follows:

$H_2Al_2Si_4O_{12}$ plus $SiO_2Al_2O_3$ plus $Fe_2O_3$ plus $TiO_2$ plus $CaO$ plus $MgO$ plus $K_2O$ (plus feldspar, if used) plus $H_2O$.

The pyrophyllite described above and which constitutes the basic element of our formula is a soft, flaky, talc-like mineral, portions of which are of a pure cream color and very soft while other portions are of a light gray hue and not as soft and flaky as the cream colored layers of the mineral.

It is also known to us that by the use of our formula other products can be manufactured from pyrophyllite, consisting of a product that may be used as a substitute for porcelain, clay caskets, vaults, flue lining and all other products for refractory uses of which pyrophyllite is the principal basic element.

What we claim is:

1. As a new article of manufacture a refractory brick having pyrophyllite as its basic element.

2. As a new article of manufacture a refractory brick containing pyrophyllite, silica, clay, feldspar and water.

3. The process of making refractory brick consisting in pulverizing pyrophyllite mixing it with silica, clay and feldspar, adding sufficient water to make a plastic compound, molding the compound in the desired shape of the brick, drying the brick for a suitable period, thereafter placing the brick in a kiln and burning it for five or six days at a sustained extremely high temperature, and thereafter allowing the brick to cool under natural temperatures for approximately four or five days.

4. The process of making refractory brick consisting in pulverizing pyrophyllite mixing it with silica, clay and feldspar, adding sufficient water to make a plastic compound, molding the compound in the desired shape of the brick, drying the brick for a suitable period, thereafter placing the brick in a kiln and burning it for five or six days at a sustained temperature of approximately 2300 degrees Fahrenheit, and allowing the brick to cool under natural temperature for approximately four or five days.

ERIE MASON HARVEY.
JOHN A. BOREN.